United States Patent [19]

Hiroyasu et al.

[11] Patent Number: 4,555,205
[45] Date of Patent: Nov. 26, 1985

[54] REAMER HOLDING DEVICE FOR MACHINING VALVE SEATS

[75] Inventors: Minoru Hiroyasu, Saitama; Hideo Yamashita, Tokyo; Tamotsu Ohguro, Saitama; Shigeru Yamagishi, Tokyo; Shigenari Shino, Saitama, all of Japan

[73] Assignee: Honda Giken Kogyo Kabushiki Kaisha, Tokyo, Japan

[21] Appl. No.: 451,154

[22] PCT Filed: Apr. 7, 1982

[86] PCT No.: PCT/JP82/00107
§ 371 Date: Nov. 24, 1982
§ 102(e) Date: Nov. 24, 1982

[87] PCT Pub. No.: WO82/03350
PCT Pub. Date: Oct. 14, 1982

[30] Foreign Application Priority Data

Apr. 7, 1981 [JP] Japan ................................. 56-51162

[51] Int. Cl.[4] ............................................. B23B 47/60
[52] U.S. Cl. ............................... 408/150; 51/241 VS; 408/147
[58] Field of Search ................. 408/92, 131, 147, 238, 408/115 R, 115 B, 97, 129, 88, 13, 714, 72 B; 33/185 R, 172 D; 82/38 R, 38 A, 39, 45, DIG. 8; 51/241 VS

[56] References Cited

U.S. PATENT DOCUMENTS

| | | | |
|---|---|---|---|
| 1,428,620 | 9/1922 | Wilbur | 82/45 X |
| 2,043,481 | 6/1936 | Krissiep et al. | 82/38 R X |
| 2,222,307 | 11/1940 | Blood | 408/714 X |
| 2,287,559 | 6/1942 | Nye | 408/147 X |
| 2,390,888 | 12/1945 | Liber | 82/38 R |
| 2,779,040 | 1/1957 | Scarff | 408/196 X |
| 3,076,363 | 2/1963 | Hack | 82/DIG. 8 X |
| 3,614,250 | 10/1971 | Connolly | 408/147 X |
| 3,622,247 | 11/1971 | Greenberg | 408/147 |
| 3,700,345 | 10/1972 | Schubert | 408/150 |
| 3,937,586 | 2/1976 | Watson | 408/147 |
| 4,175,802 | 11/1979 | Voll et al. | 408/147 X |
| 4,224,846 | 9/1980 | Eysel et al. | 408/147 X |
| 4,400,885 | 8/1983 | Consales | 33/185 R |

FOREIGN PATENT DOCUMENTS 0639657  2/1979  U.S.S.R. ............................. 408/147

Primary Examiner—William R. Briggs
Assistant Examiner—Glenn L. Webb
Attorney, Agent, or Firm—Irving M. Weiner; Joseph P. Carrier; John J. Cantarella

[57] ABSTRACT

A holding device for a rotating body comprising a tubular member (1) which permits insertion therein of the rotating body, at least three support members (2) disposed along the inner periphery of the tubular member (1) so as to be movable in a substantially radial direction, and a locking arrangement (3a, 3b, 4a, 4b, 10a, 10b) capable of independently holding each of the support members (2) in a desired position. With such device, bodies which are rotatable about an axis not coaxial with the driving shaft thereof can be held in place without having any substantial influence upon their rotational shafts. Besides, it is not necessary to pay close attention to the clearance between moving members in the manufacture and use of the device, and thus the holding device is high in versatility and low in cost.

8 Claims, 7 Drawing Figures

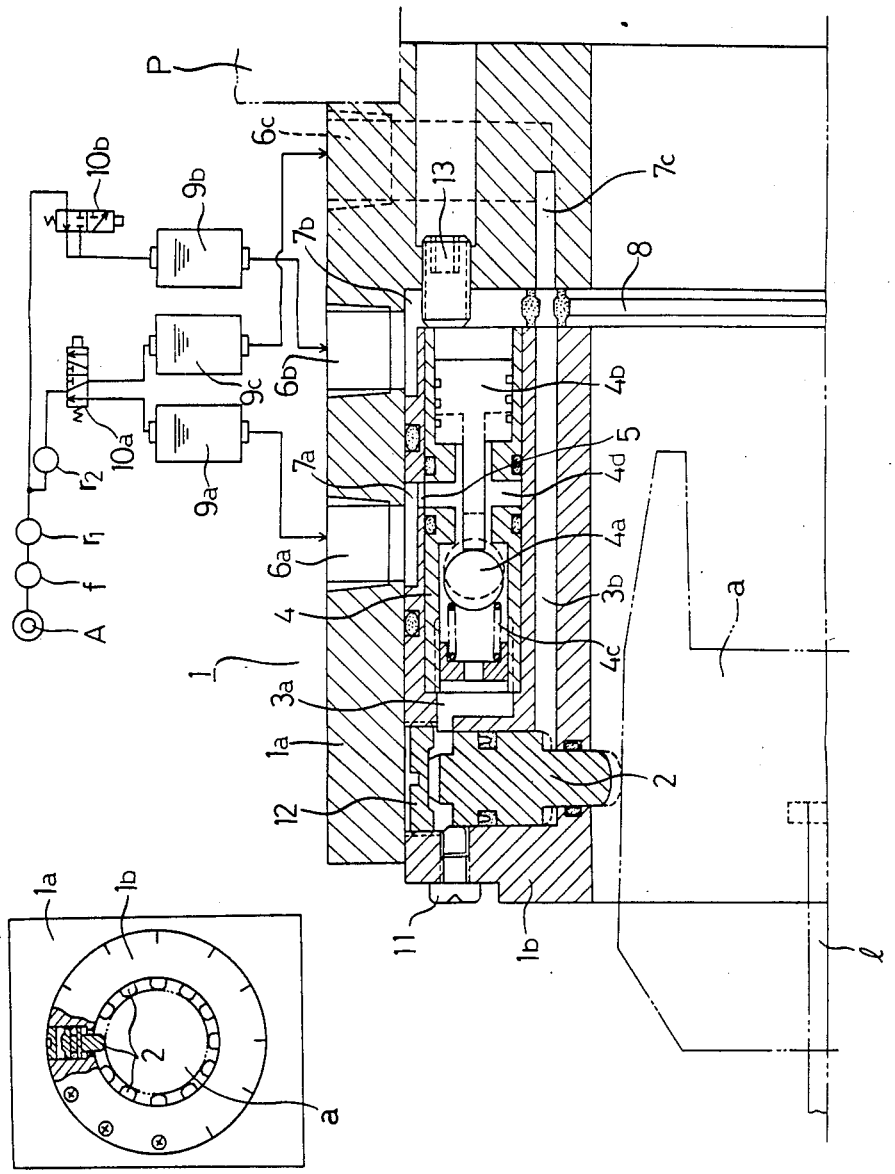

4,555,205

REAMER HOLDING DEVICE FOR MACHINING VALVE SEATS

FIELD OF ART

The present invention relates to a rotating body or reamer holding device and more particularly to a device for holding and supporting a rotating body or reamer which is rotatable about an axis which is not coaxial with its driving shaft.

BACKGROUND ART

There has previously been proposed (in Japanese Patent Application No. 31937/1981) machining equipment for machining the valve seat surface in a cylinder head of an internal combustion engine, which includes a rotating body or reamer carrying thereon machining tools and rotatable about an axis not coaxial with or out of alignment with its driving shaft.

The construction and function of such proposed machining equipment will be preliminarily described hereinbelow with reference to FIGS. 6 and 7 of the accompanying drawings.

The reference letter M generally designates an overall machining apparatus. At a central part of the machining apparatus M, a tool holder a provided centrally with a reamer l for finishing a guide bore of a valve stem guide g and also provided on the outer periphery of its central part with cutting tools c such as cutters for machining a valve seat $V_S$ is bendably connected to a spindle s through a universal joint j. On the other hand, guide bars G extend forwardly from a multiple spindle head H, and a ring-like support plate P is slidably suspended from the guide bars G. On the front surface of the support plate P there is slidably disposed a tubular bearing holder d which accommodates a self-aligning bearing b fixed to the inside of its front end portion, and a flange portion of the holder d is held by a locking plate f having locking cylinder e. In the machining operation, the multiple spindle head H is advanced while rotating the spindle s, thereby allowing the reamer l to catch the guide bore of the valve stem guide g and to move forwardly while following the guide bore as shown in FIG. 7, and in the course of this movement the tool holder a is allowed to fit in the self-aligning bearing b so that changes in inclination of the tool holder a can be absorbed by the aligning action of the self-aligning bearing b and by the sliding of the bearing holder d. When the reamer l has advanced up to the position in which it finishes following the guide bore, the locking cylinders e are actuated, allowing the respective piston pins to fix the bearing holder d in a certain state with respect to the support plate P. Thus, in a state wherein the front and rear positions of the cutting tools c are borne by the valve stem guide g and the self-aligning bearing b, respectively, the valve seat surface is machined by the cutting tools c while maintaining a high roundness and a good concentricity with respect to the guide bore.

In the above machining apparatus, however, the outside diameter of the bearing holder d incorporating the self-aligning bearing b becomes relatively large and its weight is substantially increased, so that after the tool holder a fits in the self-aligning bearing b during the forward movement of the reamer l and before it is fixed to a certain state, the weight of the self-aligning bearing b and that of the bearing holder d are imposed on the tool holder a, and in this respect there has been room for further improvement. Moreover, the inner surface of the self-aligning bearing b comes to move in the axial direction while the tool holder a is fitted therein, therefore a highly accurate clearance is needed, and thus also in this respect there has been a room for further improvement.

DISCLOSURE OF THE INVENTION

The present invention effectively solves the above-mentioned problems encountered in the aforesaid conventional holding device for rotating bodies.

It is an object of the present invention to provide a holding device for rotating bodies capable of holding a rotating body in a stable manner without exerting an excessive external force thereon and thus without having a substantial influence on the rotational shaft of the rotating body.

It is another object of the present invention to provide a holding device for rotating bodies which does not require paying close attention to the clearance between moving members in its manufacture and use and which therefore minimizes costs while increasing versatility.

For achieving the above-mentioned objects the present invention provides a holding device for a rotating body which comprises a tubular member permitting insertion therein of the rotating body, at least three support members disposed along the inner periphery of the tubular member and being movable substantially in the radial direction, and locking means for independently holding each of the support members in a desired position.

BRIEF DESCRIPTION OF THE DRAWINGS

FIG. 1 is an overall view including a semi-longitudinal section of a principal part of a holding device for rotating bodies according to a first embodiment of the present invention.

FIG. 2 is a partially cutaway schematic front view showing a principal part of the holding device of FIG. 1.

BEST FORM FOR PRACTICING THE INVENTION

Figure 3:
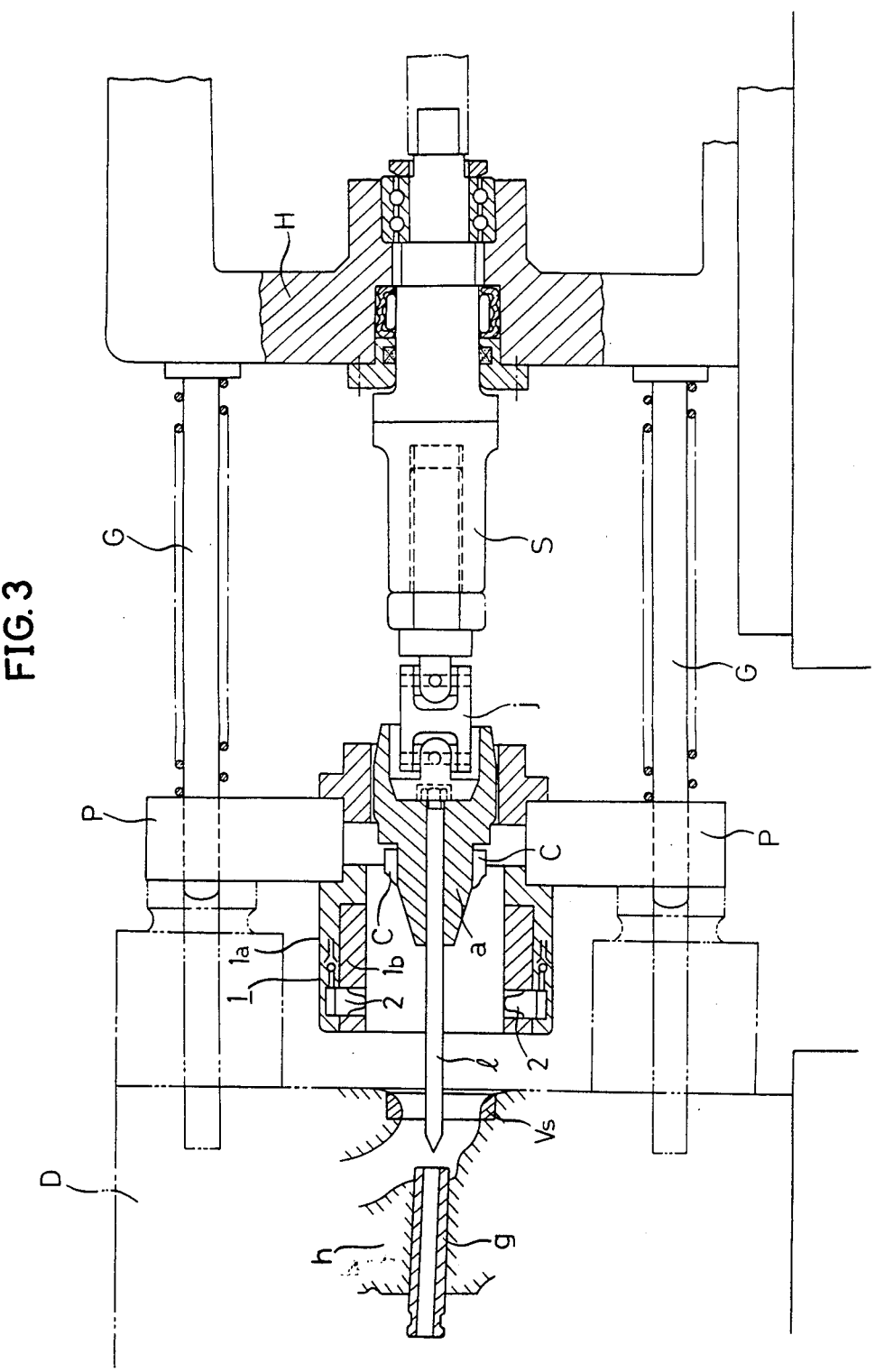
FIG. 3 is a partially cutaway side view showing a state just before starting operation of a machine tool to which the holding device of FIG. 1 is applied.
Figure 4:
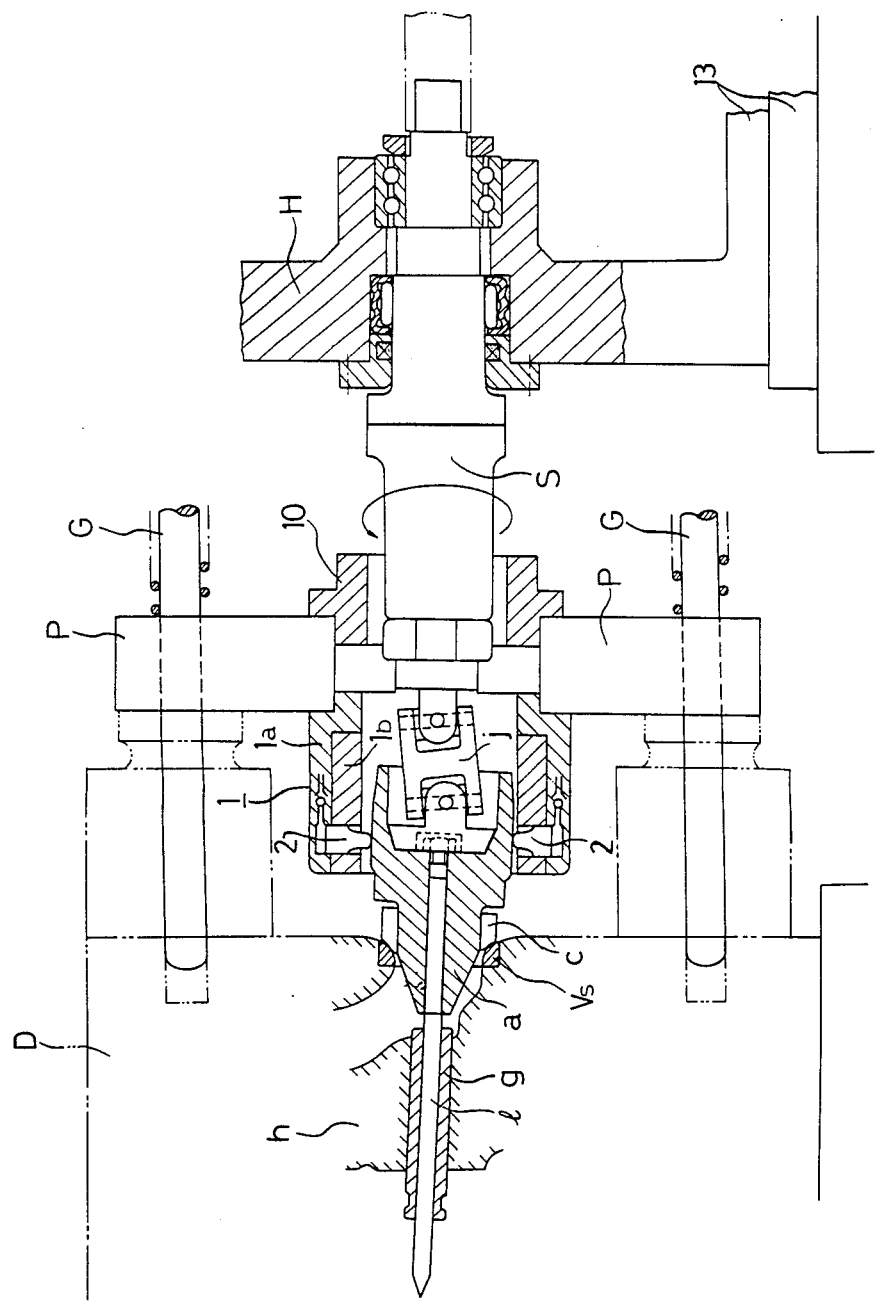
FIG. 4 is a partially cutaway side view showing a state of operation of the machine tool of FIG. 3.
Figure 6:
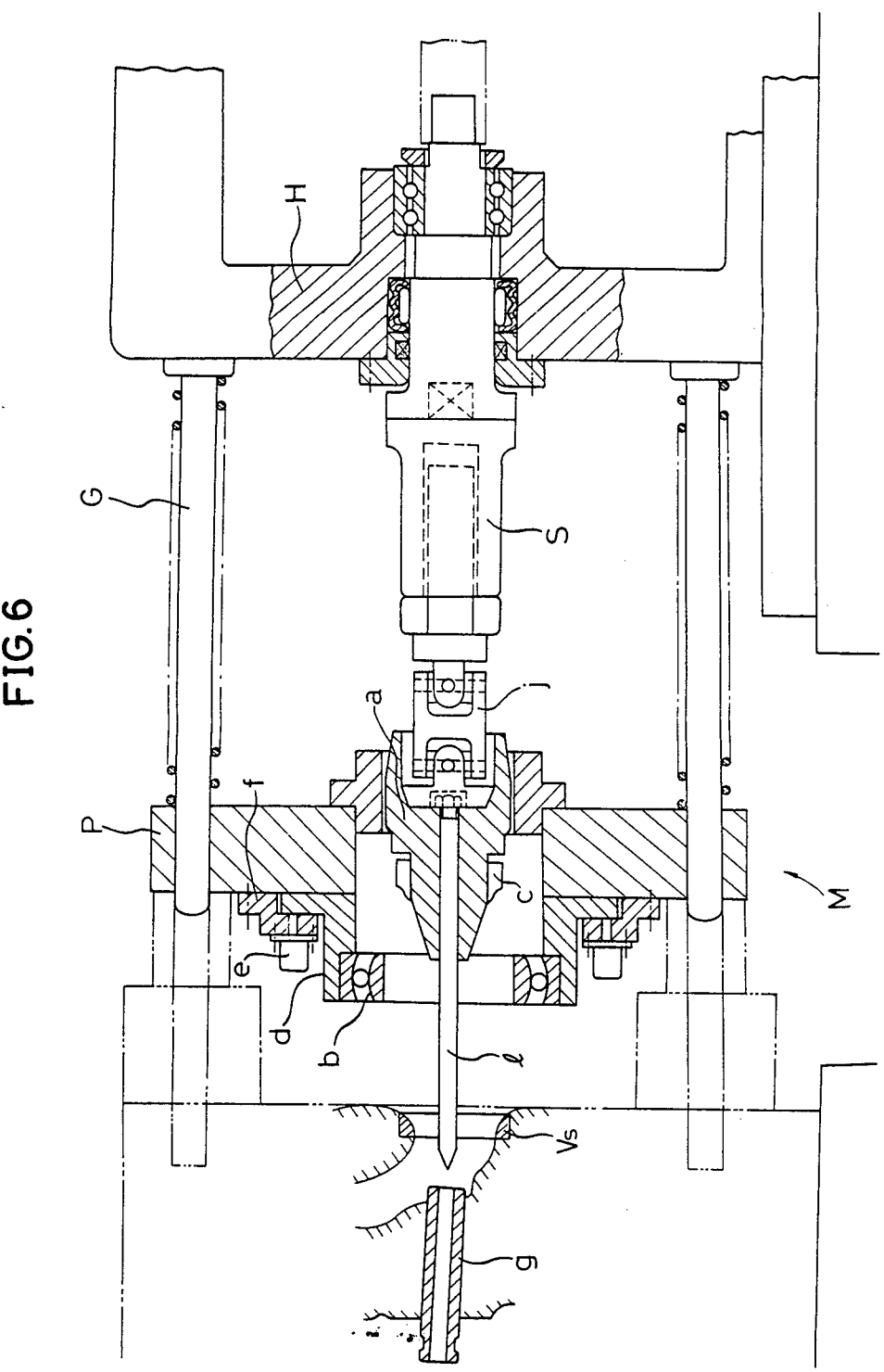
FIG. 6 is a partially cutaway side view showing a state just before starting operation of the same machine tool as that shown in FIG. 3 to which is applied a conventional holding device for rotating bodies.
Figure 7:
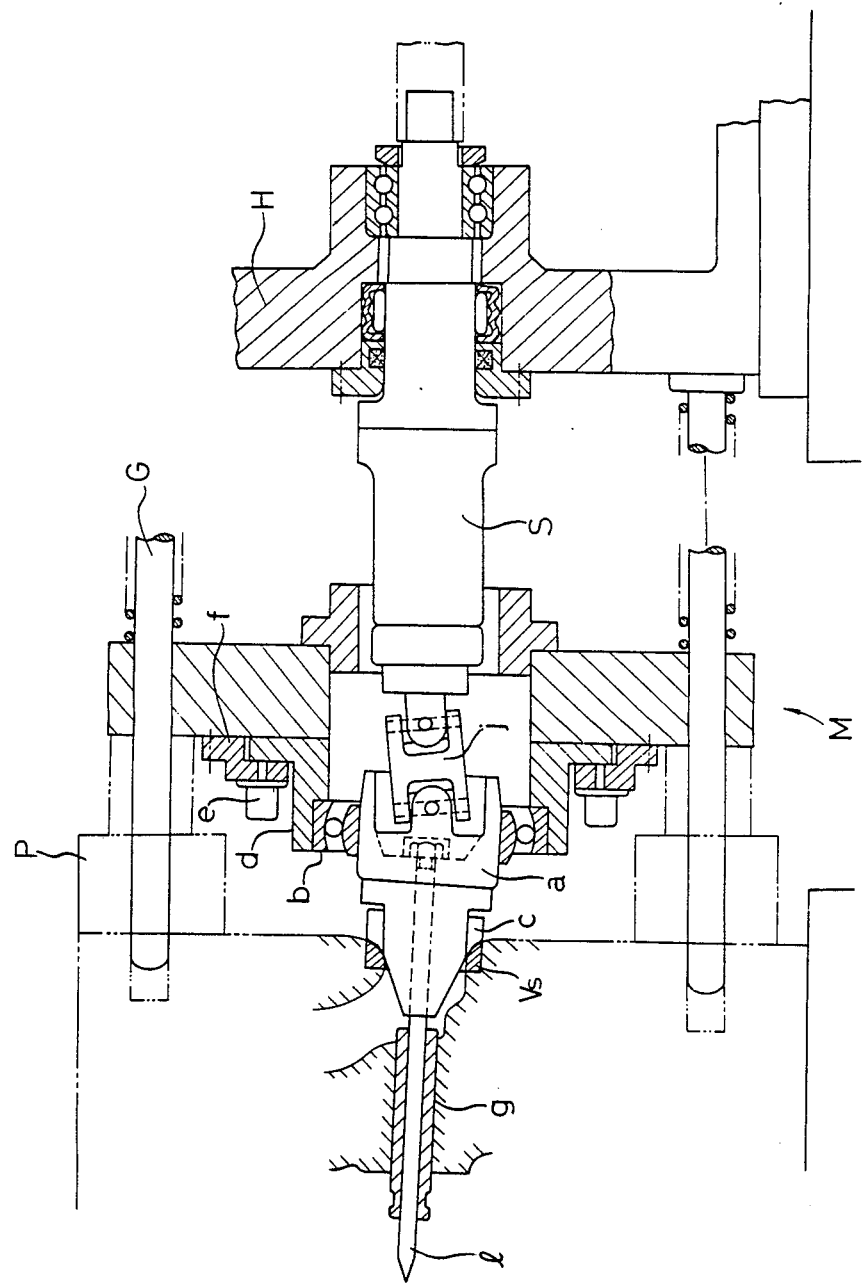
FIG. 7 is a partially cutaway side view showing a state of operation of the machine tool of FIG. 6.

Referring to FIGS. 1 and 2 which illustrate a holding device for rotating bodies according to a first embodiment of the present invention and also to FIGS. 3 and 4 which respectively illustrate a state just before operation and a state during operation of a machine tool substantially the same as the one shown in FIGS. 6 and 7 to which is applied the holding device, reference numeral 1 designates a support tube which in this embodiment has a square external shape so that it can be mounted directly in front of a centrally located circular hole of a support plate P of the machine tool. The support tube 1 has a length almost equal to the extending length of a reamer 1 and comprises an outer tube 1a fixed integrally with the support plate P and an inner tube 1b inserted and fixed within the outer tube 1a in an oil-tight manner, the inner tube 1b having an inner peripheral surface which is of a larger diameter than the outside diameter of a rear portion of a tool holder a. In a front portion of the inner tube 1b, at least three support pins 2 made of a soft metal such as gun metal are disposed at predetermined intervals in the circumferential direction so that such pins can move substantially in the radial direction of the inner tube 1b, and in the interior of the wall of the inner tube 1b there is formed a valve chamber 3a of a relatively large diameter and an elongated path 3b extending up to a rear end of the inner tube 1b in a position corresponding to each of the support pins 2 to feed a pressure oil for urging the support pin radially inwardly and outwardly. A valve body 4 somewhat shorter than the valve chamber 3a and having a rear end coplanar with the rear end of the valve chamber 3a is inserted and fixed within the valve chamber 3a. The valve body 4 is provided centrally with crosspaths 4d and is also provided at a front portion thereof with a spherical check valve 4a which is urged rearwardly with a spring 4c to block in its rearmost position the front end of a longitudinal path of the crosspaths 4d, the check valve 4a being movable in the longitudinal direction while forming a clearance with respect to the inner wall of the front portion of the valve body 4. The valve body 4 is further provided at its rear portion with a piston 4b having an extension for urging the check valve 4a forwardly through the longitudinal path of the crosspaths 4d, the piston 4b being slidable in the longitudinal direction along the inner wall of the rear portion of the valve body 4. A space is defined by the inner wall of the front portion of the valve body 4 and it communicates with the front portion of the valve chamber 3a, while when the check valve 4a is not in its rearmost position, such space communicates with a first annular groove 7a formed along the outer periphery of the inner tube 1b through the crosspaths 4d and a radial through hole 5 formed in the inner tube 1b, and further through the annular groove 7a such space communicates with a first opening 6a formed in the wall of the outer tube 1a. On the other hand, a space is defined by the inner wall of the rear portion of the valve body 4 and the back of the piston 4b and it communicates with a second annular groove 7b formed along the outer periphery of the inner tube 1b through an annular space, which annular space is defined by the rear end of the inner tube 1b, the front face of a stepped inner wall portion at the rear part of the outer tube 1a and an annular packing 8 interposed therebetween in an oil-tight manner, and through the second annular groove 7b such space further communicates with a second opening 6b formed in the wall of the outer tube 1a. The elongated path 3b formed in the inner tube 1b communicates with a third opening 6c formed in the rear portion of the outer tube 1a through a through hole formed in the packing 8 and further through a third annular groove 7c formed in the stepped inner wall portion at the rear part of the outer tube 1a.

The first opening 6a and the third opening 6c are connected to the lower portions of oil tanks 9a and 9c, respectively, through oil lines, and to the upper portions of oil tanks 9a, 9c there is fed an air pressure from an air pressure source A through an air filter f and a first-stage reducing valve $r_1$ and further through a second-stage reducing valve $r_2$ and a change-over valve 10a. On the other hand, the second opening 6b is connected through an oil line to the lower portion of a separate oil tank 9b, to the upper portion of which there is fed an air pressure from an air pressure source A through an air filter f and the first-stage reducing valve $r_1$ and then through only a change-over valve 10b.

While the holding device is not in operation, the change-over valves 10a and 10b assume the state shown in FIG. 1; that is, the air line leading to the oil tank 9a is open to the atmosphere, while the air line leading to the oil tank 9c is connected to the air pressure source A through the two reducing valves $r_2$ and $r_1$, so that the third opening 6c is charged with a relatively low-pressure oil from the oil tank 9c, and this oil is distributed to each elongated path 3b through the third annular groove 7c and acts on the lower side of each support pin 2.

On the other hand, the air line leading to the oil tank 9b is connected to the air pressure source A through one reducing valve $r_1$, so that the second opening 6b is charged with a relatively high-pressure oil from the oil tank 9b, and this oil is distributed to the rear portion of the valve body 4 through the second annular groove 7b and acts on the back of the piston 4b within the valve body 4, thereby pushing the check valve 4a forwardly to the solid line position against the biasing force of the spring 4c. As a result, the oil within the valve chamber 3 can return freely to the oil tank 9a through the crosspaths 4d, and each support pin 2 is pushed upwardly, that is, radially outwardly with respect to the inner tube 1b, by the oil pressure within the elongated path 3b and is maintained in the solid line position shown in FIG. 1.

In FIG. 1, reference numeral 11 designates an air vent plug in the inserted portion of the support pin 2; numeral 12 designates a stopper for the support pin 2; and numeral 13 designates a check pin for the valve body 4.

FIG. 3 shows a state just before machining wherein a plurality of the support tubes 1 are attached to the central part of the front face of the support plate P of the machine tool and as a result of advancement of a multiple spindle head H the support plate P is in abutment with guide posts on a jig D in which has been set a cylinder head h. In operation, spindles s are rotated and the multiple spindle head H is further advanced; as a result, the tip end of each reamer 1 moves into a guide bore of a valve guide g while catching the guide bore and then moves forardly while cutting the inner surface of the guide bore. In this case, even if the valve guide g is not mounted properly, or even if there is a small variation in the guide bore position, or even if such positional variation is different depending on workpieces, the tool holder a is bendably connected to the spindle through a universal joint j and therefore, as shown in FIG. 4, it includes in either the vertical or transverse direction following a slight deviation or inclination of the guide bore position to thereby absorb the discrepancy, so that the reamer 1 fits well in the guide bore and finishes the inner surface of the bore without undergoing an excessive force, while the tool holder a moves forwardly within the support tube 1.

When the tip end of the reamer 1 has begun projecting from the guide bore of the valve guide g and the rear part of the tool holder a has reached the front end portion of the support tube 1, the change-over valves 10 and 10b are switched over electrically by a timer or limit switch built in the machine tool, thereby connecting the air line leading to the oil tank 9a to the air pressure source A and opening the air line leading to the oil tanks 9b and 9c to the atmosphere. As a result, a relatively low pressure oil is fed from the oil tank 9a into the crosspaths of the valve body 4 through the first opening 6a, the first annular groove 7a and the through hole 5, thereby moving back the piston 4b toward its dotted line position shown in FIG. 1, and at the same time the oil enters the valve chamber 3a communicating with the crosspaths 4d and acts on the upper portion of the support pin 2, so that, as indicated with the dotted line in FIG. 1, the support pin 2 moves inwardly or toward the tool holder a and abuts the outer peripheral surface of the latter. At this time, the pressurized oil exerted on the lower portion of each support pin 2 is returned to the oil tank 9c through the elongated path 3b, the third annular groove 7c and the third opening 6c.

In this way, as shown in FIG. 2, the tool holder a is held at its outer peripheral portion firmly from the outside by a predetermined number of the support pins 2 disposed at equal intervals, while being maintained at any desired posture within the support tube 1. That is, even if the axis of rotation of the tool holder a as a rotating body and the center of the inner tube 1b are shifted from each other and the clearance between the outer peripheral surface of the tool holder a and the inner wall of the inner tube 1b is biased in a certain direction, each support pin 2 projects in an amount corresponding to the clearance in its corresponding position and abuts the tool holder a, thereby holding the latter.

Additionally, even when the outer peripheral surface of the tool holder a is somewhat away from the support pin 2 in a certain position, the support pin 2 projects in an amount corresponding to that deviation by virtue of the oil pressure in the valve chamber 3a. Conversely, even if the outer peripheral surface of the tool holder a acts to push in the support pin in a certain position, the support pin 2 once projected will never be withdrawn as long as it is supported by the non-compressive oil, and in this case a fluid pressure corresponding to such push-in force is generated within the valve chamber 3a. Since such a phenomenon occurs with respect to each of the support pins 2 disposed in the inner peripheral wall of the inner tube 1b, the tool holder a and the reamer 1 are supported by the support pins 2 so as to maintain a central axial orientation.

When the ejection of the support pins 2 is over and a resultant force comprising the biasing force of the spring 4c and the oil pressure within the valve chamber 3a acting in the direction of forcing back the check valve 4i a in the valve body 4 overcomes a resultant force trying to push forward the valve 4a containing a pressure difference based on an orifice effect around the valve 4a, the valve 4a moves to its dotted line position in FIG. 1 and closes the crosspaths 4d; as a result, the support pins 2 are locked in the respective states until the valve 4a opens again.

In such a state, if the spindle s is slightly advanced together with the multiple spindle head H, the tool holder a moves a corresponding distance while rotating within the support pins 2, thus allowing the cutting tool c on the tool holder a to machine the seat surface of a valve sear $V_S$. In this case, at the front side the reamer 1 is borne by the valve guide g and at the rear side the tool holder a is borne by the support pins 2, so that the cutting tool c, without undergoing lateral vibrations, can machine the valve seat surface with a high roundness while maintaining the concentricity with the valve stem guide bore.

After the machining for the valve seat $V_S$ has been completed, the multiple spindle head H is moved back slightly and the change-over valves 10a and 10b are again switched over, thereby allowing the air line leading to the oil tank 9a to open to the atmosphere and the air lines leading to the oil tanks 9b and 9c to communicate with the air pressure source A. As a result, compressed air at a relatively high pressure is fed to the oil tank 9b and a correspondingly high pressure oil flows into the support tube 1 through the second opening 6b and is then distributed to the rear portion of each valve body 4 through the second annular groove 7b, so that the piston 4b is pushed out to its solid line position shown in FIG. 1, thereby forcing open the check valve 4a forwardly and allowing the crosspaths 4d and the valve chamber 3a to communicate with each other. At the same time, a relatively low pressure oil is fed from the oil tank 9c into the support tube 1 through the third opening 6c and is then distributed to each elongated path 3b in the inner tube 1b through the third annular groove 7c thereby acting on the lower side of each support pin 2, so that each support pin 2 moves outwards and returns to its solid line position shown in FIG. 1, and the tool holder a is thus released from its held state. As this time, the oil within the valve chamber 3a is returned from the first opening 6a into the oil tank 9a through the central part of the valve body 4 and the crosspaths 4d, and thus the initial non-operating state is obtained.

Figure 5:
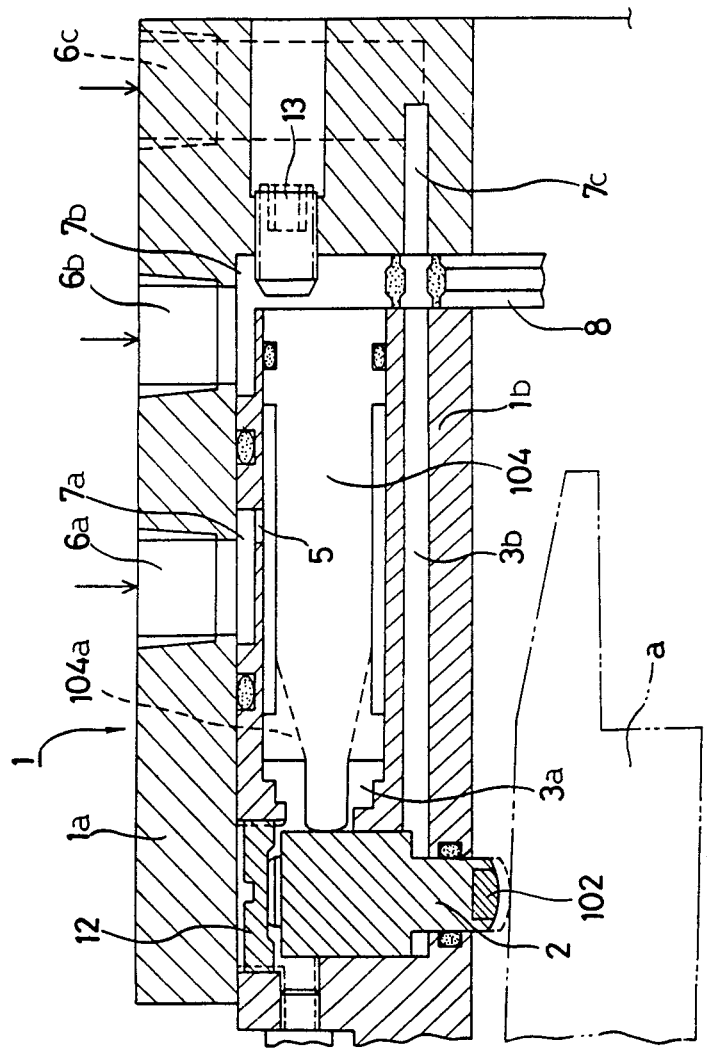
FIG. 5 is a semi-longitudinal sectional view showing a principal part of a holding device for rotating bodies according to a second embodiment of the present invention.

A holding device for rotating bodies according to a second embodiment of the present invention will be described hereinunder with reference to FIG. 5, wherein parts substantially similar to those in the above first embodiment will be accompanied by the same reference numerals or letters.

The support tube 1 comprises a square-shaped outer tube 1a and an inner tube 16 fitted and fixed therein, and in this second embodiment, in place of the valve body 4 used in the first embodiment, a stem valve 104 provided at its front end portion with a channel 104a which communicates with the large-diameter valve chamber 3a in the inner tube 1b is disposed within the valve chamber 3a, and at the time of ejection of each support pin 2 a relatively high pressure oil is allowed to act on the rear end of the stem valve 104 to lock each support pin 2. A pad member 102 is attached to the inner end of the support pin 2.

In the above embodiments the holding device for rotating bodies in accordance with the present invention has been described in connection with the machine tool which machines the guide bore for the valve stem and the seat surface of the valve seat in the cylinder head, but it is also applicable to rotating bodies in general which are required to be rotatably even about an axis not coaxial with a driving shaft.

According to the present invention, as will be apparent from the foregoing description, the rotating body is supported in a stable manner without giving rise to vibration, and unlike conventional self-aligning bearings, it is not necessary to take a high-accuracy clearance into consideration. Besides, even if the support pins are worn by contact with the rotating body, it is possible to permit the support pins to project in amounts corresponding to the respective wearing thereof, so that their function in supporting the rotating body is not impaired. Furthermore, when it is not necessary to support the rotating body, so as the support pins are withdrawn, not to impose an unnecessary load on the rotating body, and consequently there occurs neither alteration of axial orientation nor dragging.

Possibility of Industrial Utilization

The present invention provides a holding device for rotating bodies which has no substantial influence upon the rotational shafts of the rotating bodies and which eliminates any need for paying close attention to the clearance between moving members in the manufacture and use of the device. According to the present invention, therefore, there is obtained a holding device for rotating bodies which ensures a high-accuracy rotation for the rotating bodies, in addition to a high versatility and low cost.

We claim:

1. A holding device for a rotating tool, comprising:
   a tubular member adapted to surround said rotating tool;
   at least three support members for supporting said tool, said support members being carried on said tubular member and disposed along a circumferential portion of said tubular member;
   a hydraulic system adapted to move said support members substantially radially relative to said tubular member and to lock said support members on said tubular member;
   means for driving said tool to rotate while permitting the inclination of said tool so as to render the axis of rotation of said tool to be guided by a bore in a workpiece; and
   said hydraulic system being adapted to move said support members radially inwardly into a position at which said support members abut against said rotating tool which has the axis thereof preset at a predetermined posture, and to lock said support members on said tubular member at said position.

2. A holding device according to claim 1, wherein said hydraulic system includes a locking mechanism for each said support member, and a single oil pressure feed system for feeding oil pressure to all of said locking mechanisms.

3. A holding device according to claim 2, wherein said locking mechanisms are disposed in the wall of said tubular member and said oil pressure feed system is disposed outside said tubular member.

4. A holding device according to claim 3, wherein said support members are each provided with an embedded portion fitted in the wall of said tubular member so as to be movable in the radial direction of said tubular member, said embedded portion having a first pressure receiving surface and a second pressure receiving surface, said first and second pressure receiving surfaces being adapted to receive oil pressures to thereby urge each said support member inwardly and outwardly, respectively, in said radial direction.

5. A holding device according to claim 4, wherein said locking mechanisms are each provided with a first hydraulic circuit and a second hydraulic circuit, said first and second hydraulic circuits communicating with first and second oil chambers, respectively, said first and second oil chambers being partially defined by said first and second pressure receiving surfaces, respectively, and said oil pressure feed system is adapted to feed a first predetermined oil pressure and a second predetermined oil pressure higher than said first oil pressure to said first and second hydraulic circuits selectively while switching over from each other.

6. A holding device according to claim 5, wherein said locking mechanisms are each provided at an inlet of said first oil chamber with a check valve member which is urged toward a closing side at all times and also with a piston member for moving said check valve member toward an opening side.

7. A holding device according to claim 6, wherein said piston member has a third pressure receiving surface and a fourth pressure receiving surface, said third and fourth pressure receiving surfaces being adapted to receive oil pressures to thereby urge said piston member toward said opening side and said closing side, respectively, of said check valve member, said locking mechanisms are each provided with a third hydraulic circuit and a fourth hydraulic circuit, said third and fourth hydraulic circuits communicating with a third oil chamber and a fourth oil chamber, respectively, said third and fourth oil chambers being partially defined by said third and fourth pressure receiving surfaces, respectively, said fourth hydraulic circuit communicating with said first hydraulic circuit, and said oil pressure feed system being adapted to feed said first predetermined oil pressure and a third predetermined oil pressure higher than said second predetermined oil pressure to said third hydraulic circuit.

8. A holding device according to claim 7, wherein said oil pressure feed system has a first stage of connection in which said first, second and third predetermined oil pressures are fed to said first, second and third hydraulic circuits, respectively, and a second state of connection in which said first and second predetermined oil pressures are fed to said second and third hydraulic circuits and to said first hydraulic circuit, respectively, and is further provided with switching means for switching said oil pressure feed system into said second state of connection when said rotating tool is to be held in place and into said first state of connection when said rotating tool is to be released from its held state.

* * * * *